(12) United States Patent
Merlin et al.

(10) Patent No.: US 8,363,587 B2
(45) Date of Patent: Jan. 29, 2013

(54) SIGNALING METHODS FOR MMSE PRECODING WITH EIGENMODE SELECTION

(75) Inventors: Simone Merlin, Solesino (IT); Hemanth Sampath, San Diego, CA (US); Santosh Abraham, San Diego, CA (US); Alok Aggarwal, Foster City, CA (US); Vinay Sridhara, Santa Clara, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 777 days.

(21) Appl. No.: 12/408,938

(22) Filed: Mar. 23, 2009

(65) Prior Publication Data
US 2010/0238912 A1 Sep. 23, 2010

(51) Int. Cl.
*H04H 20/71* (2008.01)
(52) U.S. Cl. .................................................. 370/312
(58) Field of Classification Search .................. 370/312, 370/315, 329, 338, 335, 320, 310.2, 227, 370/208, 328, 331, 332, 337, 341, 342, 344, 370/347, 349, 352, 353, 395.21; 375/267, 375/299; 455/101, 132
See application file for complete search history.

(56) References Cited

U.S. PATENT DOCUMENTS

| | | | |
|---|---|---|---|
| 5,471,647 A | 11/1995 | Gerlach et al. | |
| 7,702,029 B2 * | 4/2010 | Kotecha et al. | 375/267 |
| 2001/0038630 A1 | 11/2001 | Tong et al. | |
| 2005/0032521 A1 | 2/2005 | Lee et al. | |

FOREIGN PATENT DOCUMENTS

| | | |
|---|---|---|
| EP | 1508992 A2 | 2/2005 |
| KR | 2008096079 A | 10/2008 |

OTHER PUBLICATIONS

International Search Report and Written Opinion—PCT/US2010/027856—ISA/EPO—Oct. 25, 2010.

* cited by examiner

*Primary Examiner* — Chi Pham
*Assistant Examiner* — Alexander O Boakye
(74) *Attorney, Agent, or Firm* — Kenyon S. Jenckes

(57) ABSTRACT

Different methods of signaling between an access point and user terminals in a multiuser wireless system for performing a minimum mean square error (MMSE) precoding at the access point preceded with eigenmode selection are provided. For one embodiment of the present disclosure, a compact feedback may be utilized between a plurality of user terminals and the access point. For another embodiment of the present disclosure, a hybrid feedback may be utilized between the plurality of user terminals and the access point. For yet another embodiment of the present disclosure, a full feedback may be utilized between the plurality of user terminals and the access point.

53 Claims, 9 Drawing Sheets

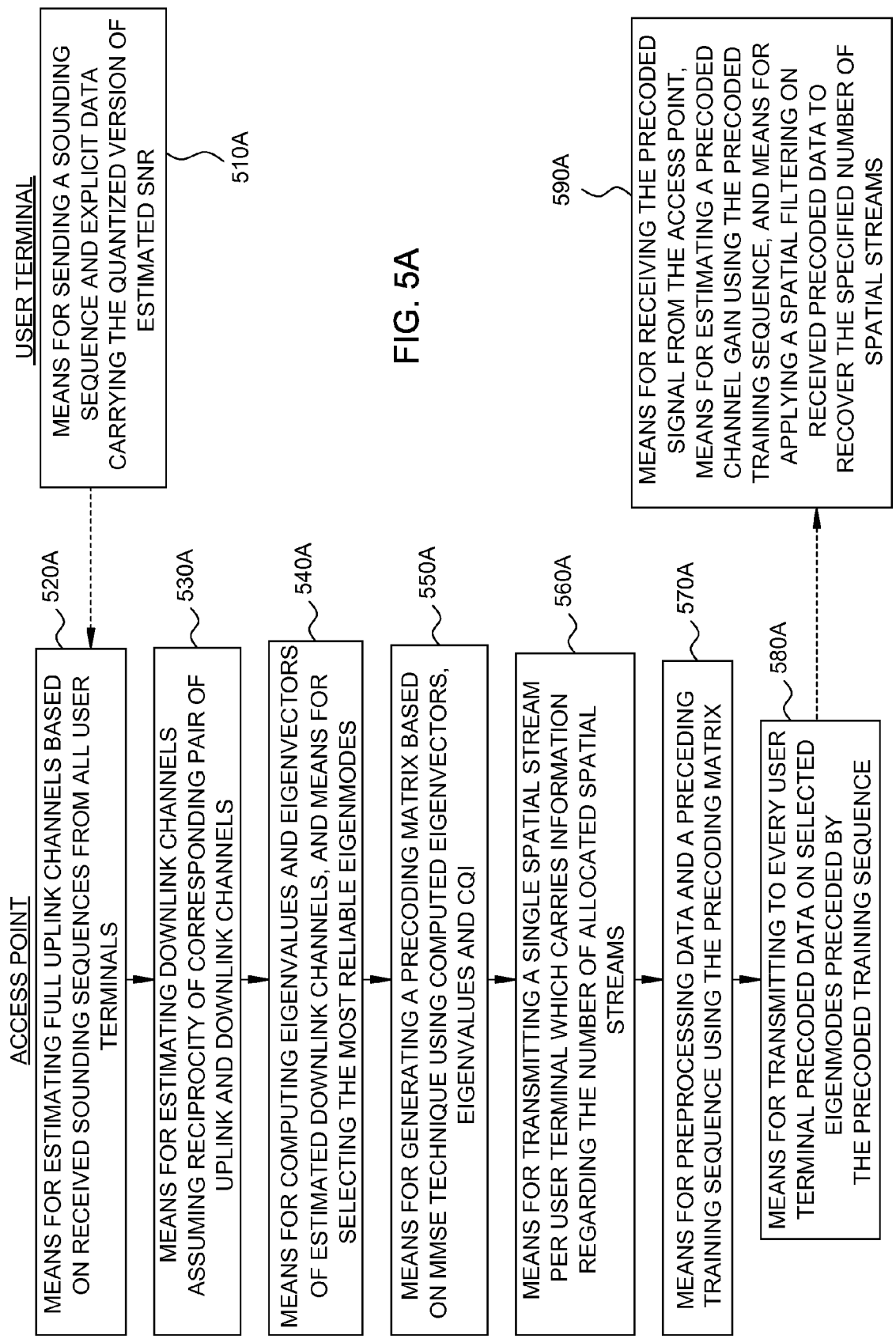

SIGNALING METHODS FOR MMSE PRECODING WITH EIGENMODE SELECTION

TECHNICAL FIELD

The present disclosure generally relates to communication, and more specifically to a signaling between an access point and user terminals in a multiuser wireless system for performing a minimum mean square error (MMSE) preceding at the access point preceded with eigenmode selection.

BACKGROUND

In order to address the issue of increasing bandwidth requirements demanded for wireless communication systems, different schemes are being developed to allow multiple user terminals to communicate with a single access point by sharing the same channel (same time and frequency resources) while achieving high data throughputs. Spatial Division Multiple Access (SDMA) represents one such approach that has recently emerged as a popular technique for the next generation communication systems. SDMA techniques may be adopted in several emerging wireless communications standards such as IEEE 802.11 (IEEE is the acronym for the Institute of Electrical and Electronic Engineers, 3 Park Avenue, 17th floor, New York, N.Y.) and Long Term Evolution (LTE).

In SDMA systems, an access point may transmit or receive different signals to or from a plurality of user terminals at the same time and using the same frequency. In order to achieve reliable data communication, signals dedicated to different user terminals may need to be mutually orthogonal and located in sufficiently different directions. Independent signals may be simultaneously transmitted from each of multiple space-separated antennas at the access point. Consequently, the combined transmissions may be mutually orthogonal and/or directional; i.e., the signal that is dedicated for each user terminal may be relatively strong in the direction of that particular user terminal, and sufficiently weak in directions of other user terminals. Similarly, the access point may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multi-antenna communication system employs multiple transmit antennas at a transmitting entity and one or more receive antennas at a receiving entity for data transmission. The multi-antenna communication system may thus be a multiple-input multiple-output (MIMO) system. The MIMO system employs multiple ($N_t$) transmit antennas and multiple ($N_r$) receive antennas for data transmission. A MIMO channel formed by the $N_t$ transmit antennas and the $N_r$ receive antennas may be decomposed into $N_{sh}$ spatial channels, where $N_{sh} \leq \min \{N_t, N_r\}$. The $N_{sh}$ spatial channels may be used to transmit $N_{sh}$ independent data streams in a manner to achieve greater overall throughput.

In a multiple-access MIMO system based on SDMA, an access point can communicate with one or more user terminals at any given moment. If the access point communicates with a single user terminal, then the $N_t$ transmit antennas are associated with one transmitting entity (either the access point or the user terminal), and the $N_r$ receive antennas are associated with one receiving entity (either the user terminal or the access point). The access point can also communicate with multiple user terminals simultaneously via SDMA. In general, for SDMA, the access point utilizes multiple antennas for data transmission and reception, and each of the user terminals typically utilizes less than the number of access point antennas for data transmission and reception.

Good performance (e.g., high transmission capacity and low error rate) can be achieved by transmitting data on eigenmodes of MIMO channels between the access point and every individual user terminal. The eigenmodes may be viewed as orthogonal spatial channels. The transmission on eigenmodes may provide decreased inter-user interference, as well as decreased interference between different spatial streams simultaneously transmitted from the access point antennas and dedicated to a single user terminal. Every user terminal may estimate a MIMO channel response, perform singular-value decomposition of the channel matrix, select one or more most reliable eigenmodes (i.e., eigenmodes with the largest eigenvalues), and send to the access point via feedback the corresponding quantized eigenvectors along with related eigenvalues and channel quality information (CQI). The access point may then generate the precoding matrix and perform spatial processing (beamforming) using the generated precoding matrix in order to multiplex data to different user terminals with reduced inter-user interference.

Therefore, there is a need in the art for efficient signaling in the multiuser wireless system between the access point and user terminals.

SUMMARY

Certain embodiments provide a method for signaling in a multiuser wireless communication system with compact feedback. The method generally includes sending to a plurality of user terminals a predefined training sequence indicating a maximum number of spatial streams for each of the user terminals to send feedback, and receiving via feedback channels from each of the user terminals a quantized version of selected eigenvectors, corresponding quantized eigenvalues, and quantized channel quality information (CQI).

Certain embodiments provide a method for signaling in a multiuser wireless communication system with compact feedback. The method generally includes estimating a channel between an access point and a user terminal based on a received training sequence, performing a singular value decomposition to compute eigenvalues and eigenvectors of the estimated channel, and selecting up to a specified number of most reliable eigenmodes to be fed back to the access point.

Certain embodiments provide a method for signaling in a multiuser wireless communication system with hybrid feedback. The method generally includes estimating full uplink channels based on a sounding sequences received from a plurality of user terminals, estimating a downlink channel between the access point and each of the user terminals assuming reciprocity of corresponding uplink and downlink channels, computing eigenvalues and eigenvectors of estimated downlink channels, and selecting most reliable eigenmodes up to a predefined number per downlink channel between the access point and each of the user terminals.

Certain embodiments provide a method for signaling in a multiuser wireless communication system with hybrid feedback. The method generally includes transmitting a sounding sequence along with explicit data carrying a quantized version of estimated Channel Quality Information (CQI) at a user terminal.

Certain embodiments provide a method for signaling in a multiuser wireless communication system with full feedback. The method generally includes transmitting a predefined training sequence, computing eigenvalues and eigenvectors of estimated downlink channels, and selecting most reliable eigenmodes up to a predefined number per downlink channel between an access point and every individual user terminal.

Certain embodiments provide a method for signaling in a multiuser wireless communication system with full feedback. The method generally includes estimating a channel between an access point and a user terminal based on a received training sequence, and transmitting a quantized version of a normalized full downlink channel matrix and a quantized version of estimated channel quality information (CQI).

Certain embodiments provide an apparatus for signaling in a multiuser wireless communication system with compact feedback. The apparatus generally includes logic for sending to a plurality of user terminals a predefined training sequence indicating a maximum number of spatial streams for each of the user terminals to send feedback, and logic for receiving via feedback channels from each of the user terminals a quantized version of selected eigenvectors, corresponding quantized eigenvalues, and quantized channel quality information (CQI).

Certain embodiments provide an apparatus for signaling in a multiuser wireless communication system with compact feedback. The apparatus generally includes logic for estimating a channel between an access point and a user terminal based on a received training sequence, logic for performing a singular value decomposition to compute eigenvalues and eigenvectors of the estimated channel, and logic for selecting up to a specified number of most reliable eigenmodes to be fed back to the access point.

Certain embodiments provide an apparatus for signaling in a multiuser wireless communication system with hybrid feedback. The apparatus generally includes logic for estimating full uplink channels based on a sounding sequences received from a plurality of user terminals, logic for estimating a downlink channel between the access point and each of the user terminals assuming reciprocity of corresponding uplink and downlink channels, logic for computing eigenvalues and eigenvectors of estimated downlink channels, and logic for selecting most reliable eigenmodes up to a predefined number per downlink channel between the access point and each of the user terminals.

Certain embodiments provide an apparatus for signaling in a multiuser wireless communication system with hybrid feedback. The apparatus generally includes logic for transmitting a sounding sequence along with explicit data carrying a quantized version of estimated Channel Quality Information (CQI) at a user terminal.

Certain embodiments provide an apparatus for signaling in a multiuser wireless communication system with full feedback. The apparatus generally includes logic for transmitting a predefined training sequence, logic for computing eigenvalues and eigenvectors of estimated downlink channels, and logic for selecting most reliable eigenmodes up to a predefined number per downlink channel between an access point and every individual user terminal.

Certain embodiments provide an apparatus for signaling in a multiuser wireless communication system with full feedback. The apparatus generally includes logic for estimating a channel between an access point and a user terminal based on a received training sequence, and logic for transmitting a quantized version of a normalized full downlink channel matrix and a quantized version of estimated channel quality information (CQI).

Certain embodiments provide an apparatus for signaling in a multiuser wireless communication system with compact feedback. The apparatus generally includes means for sending to a plurality of user terminals a predefined training sequence indicating a maximum number of spatial streams for each of the user terminals to send feedback, and means for receiving via feedback channels from each of the user terminals a quantized version of selected eigenvectors, corresponding quantized eigenvalues, and quantized channel quality information (CQI).

Certain embodiments provide an apparatus for signaling in a multiuser wireless communication system with compact feedback. The apparatus generally includes means for estimating a channel between an access point and a user terminal based on a received training sequence, means for performing a singular value decomposition to compute eigenvalues and eigenvectors of the estimated channel, and means for selecting up to a specified number of most reliable eigenmodes to be fed back to the access point.

Certain embodiments provide an apparatus for signaling in a multiuser wireless communication system with hybrid feedback. The apparatus generally includes means for estimating full uplink channels based on a sounding sequences received from a plurality of user terminals, means for estimating a downlink channel between the access point and each of the user terminals assuming reciprocity of corresponding uplink and downlink channels, means for computing eigenvalues and eigenvectors of estimated downlink channels, and means for selecting most reliable eigenmodes up to a predefined number per downlink channel between the access point and each of the user terminals.

Certain embodiments provide an apparatus for signaling in a multiuser wireless communication system with hybrid feedback. The apparatus generally includes means for transmitting a sounding sequence along with explicit data carrying a quantized version of estimated Channel Quality Information (CQI) at a user terminal.

Certain embodiments provide an apparatus for signaling in a multiuser wireless communication system with full feedback. The apparatus generally includes means for transmitting a predefined training sequence, means for computing eigenvalues and eigenvectors of estimated downlink channels, and means for selecting most reliable eigenmodes up to a predefined number per downlink channel between an access point and every individual user terminal.

Certain embodiments provide an apparatus for signaling in a multiuser wireless communication system with full feedback. The apparatus generally includes means for estimating a channel between an access point and a user terminal based on a received training sequence, and means for transmitting a quantized version of a normalized full downlink channel matrix and a quantized version of estimated channel quality information (CQI).

Certain embodiments provide a computer-program product for signaling in a multiuser wireless communication system with compact feedback, comprising a computer readable medium having instructions stored thereon, the instructions being executable by one or more processors. The instructions generally include instructions for sending to a plurality of user terminals a predefined training sequence indicating a maximum number of spatial streams for each of the user terminals to send feedback, and instructions for receiving via feedback channels from each of the user terminals a quantized version of selected eigenvectors, corresponding quantized eigenvalues, and quantized channel quality information (CQI).

Certain embodiments provide a computer-program product for signaling in a multiuser wireless communication system with compact feedback, comprising a computer readable medium having instructions stored thereon, the instructions being executable by one or more processors. The instructions generally include instructions for estimating a channel between an access point and a user terminal based on a received training sequence, instructions for performing a singular value decomposition to compute eigenvalues and eigenvectors of the estimated channel, and instructions for selecting up to a specified number of most reliable eigenmodes to be fed back to the access point.

Certain embodiments provide a computer-program product for signaling in a multiuser wireless communication system with hybrid feedback, comprising a computer readable medium having instructions stored thereon, the instructions being executable by one or more processors. The instructions generally include instructions for estimating full uplink channels based on a sounding sequences received from a plurality of user terminals, instructions for estimating a downlink channel between the access point and each of the user terminals assuming reciprocity of corresponding uplink and downlink channels, instructions for computing eigenvalues and eigenvectors of estimated downlink channels, and instructions for selecting most reliable eigenmodes up to a predefined number per downlink channel between the access point and each of the user terminals.

Certain embodiments provide a computer-program product for signaling in a multiuser wireless communication system with hybrid feedback, comprising a computer readable medium having instructions stored thereon, the instructions being executable by one or more processors. The instructions generally include instructions for transmitting a sounding sequence along with explicit data carrying a quantized version of estimated Channel Quality Information (CQI) at a user terminal.

Certain embodiments provide a computer-program product for signaling in a multiuser wireless communication system with full feedback, comprising a computer readable medium having instructions stored thereon, the instructions being executable by one or more processors. The instructions generally include instructions for transmitting a predefined training sequence, instructions for computing eigenvalues and eigenvectors of estimated downlink channels, and instructions for selecting most reliable eigenmodes up to a predefined number per downlink channel between an access point and every individual user terminal.

Certain embodiments provide a computer-program product for signaling in a multiuser wireless communication system with full feedback, comprising a computer readable medium having instructions stored thereon, the instructions being executable by one or more processors. The instructions generally include instructions for estimating a channel between an access point and a user terminal based on a received training sequence, and instructions for transmitting a quantized version of a normalized full downlink channel matrix and a quantized version of estimated channel quality information (CQI).

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 5A illustrates example components capable of performing the operations illustrated in FIG. 5.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 October 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

Figure 1:
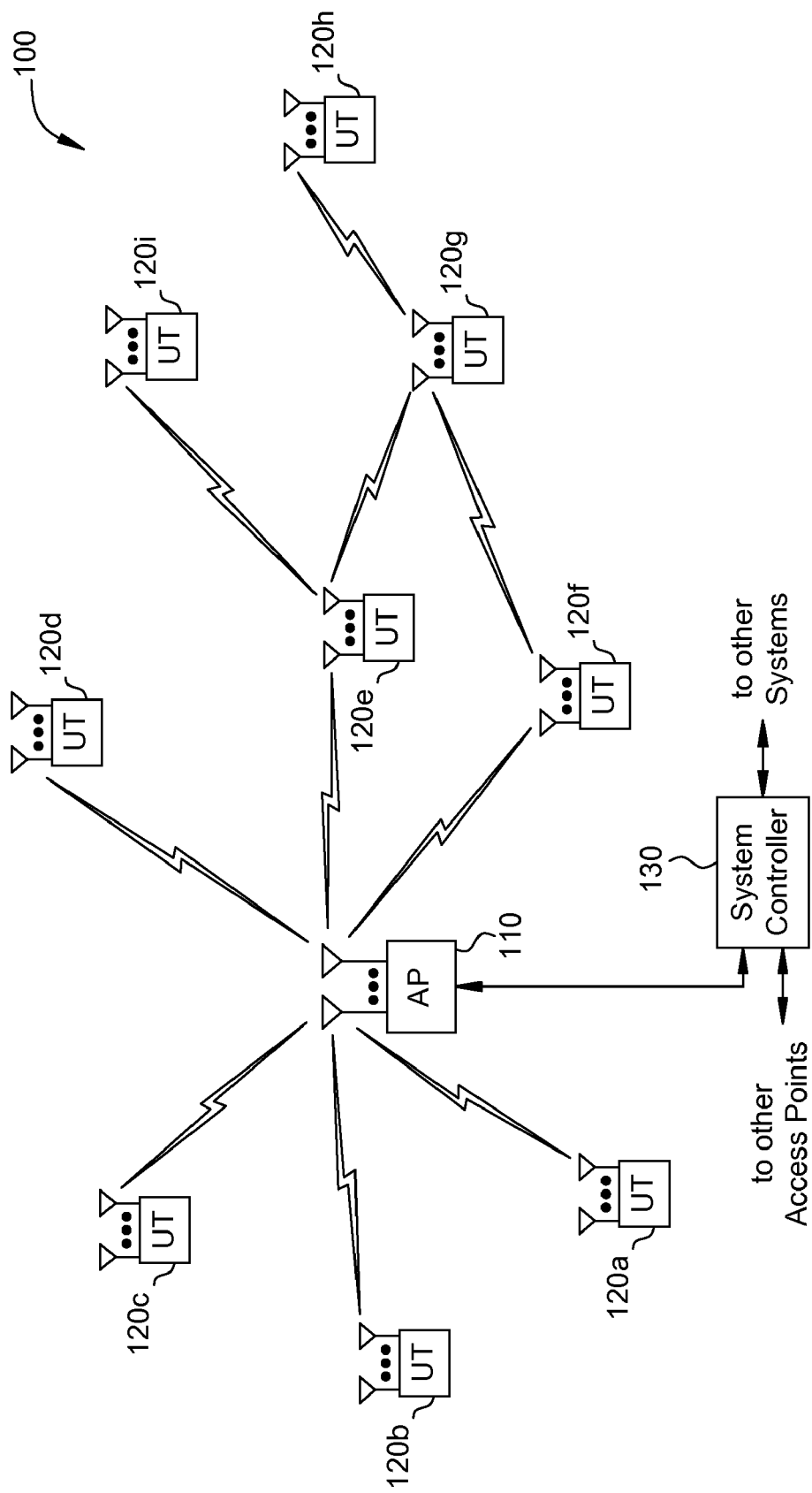
FIG. 1 shows a multiple-input multiple-output (MIMO) system with one access point and a plurality of multi-antenna user terminals in accordance with certain embodiments of the present disclosure.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via SDMA, for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
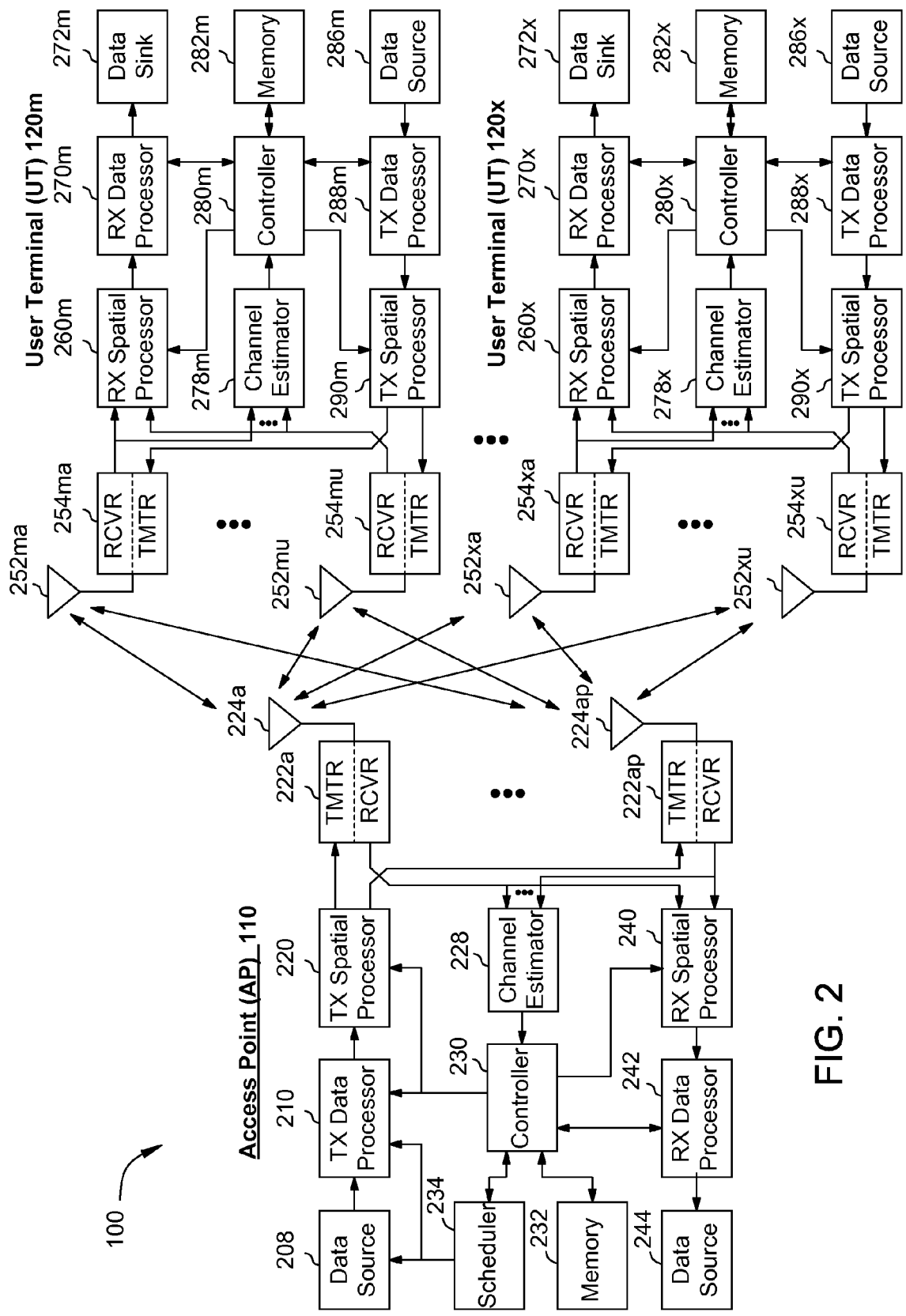
FIG. 2 shows a block diagram of an access point and a plurality of user terminals in accordance with certain embodiments of the present disclosure.

FIG. 2 shows a block diagram of access point 110 and two user terminals 120m and 120x in MIMO system 100. Access point 110 is equipped with N. antennas 224a through 224t. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

In the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

In the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{u,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
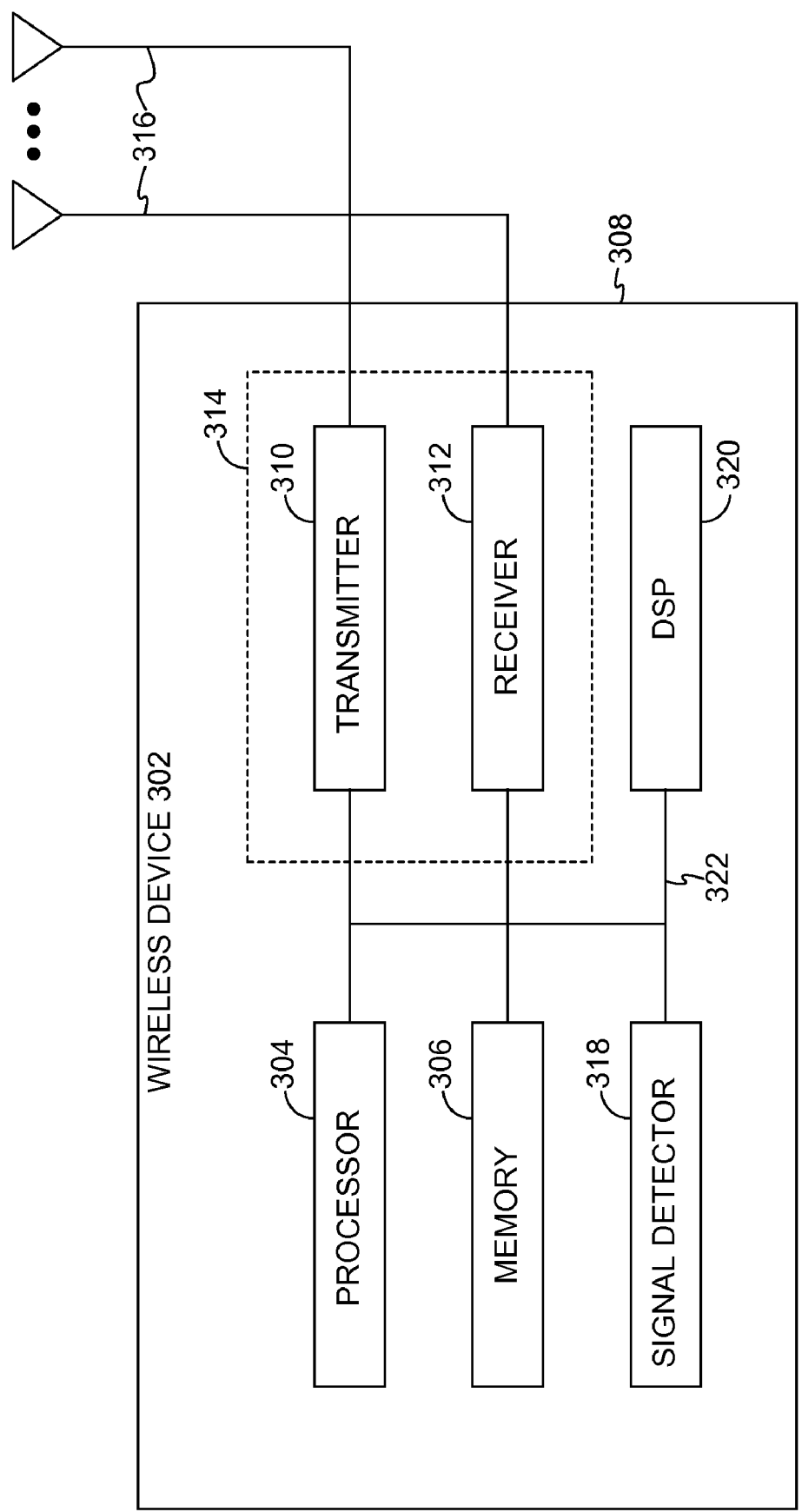
FIG. 3 illustrates various components that may be utilized in a wireless device in accordance with certain embodiments of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

The wireless system shown in FIGS. 1-3 may refer to the SDMA system where antennas at the access point are located in sufficiently different directions, which insures no interference between simultaneously transmitted spatial streams dedicated to different user terminals. For certain embodiments of the present disclosure, the wireless system shown in FIGS. 1-3 may refer to the multiuser system where a precoding (beamforming) of the transmission signal is applied providing orthogonality between spatial streams dedicated to different user terminals, while the access point antennas do not necessarily need to be located in sufficiently different directions.

Multiuser Mimo System Model

As shown in FIG. 1, user terminals 120 may be distributed throughout the coverage area of the access point 110. The access point 110 may be equipped with multiple ($N_{ap}=N_y$) antennas for data transmission. Every user terminal 120 may be equipped with multiple antennas for data reception. User terminals in the system may be equipped with the same or different numbers of antennas. For simplicity and without losing generality, it can be assumed that all user terminals 120 in the multiuser MIMO system 100 may be equipped with the same number of antennas ($N_{ut}=N_r$).

In general, different MIMO channels are formed by the $N_t$ antennas at the access point and the $N_r$ antennas at each user terminal. For a single-carrier MIMO system, a MIMO channel formed by the $N_t$ antennas at the access point and the $N_r$ antennas at a given $k^{th}$ user terminal (k=1, ..., K, where K is a total number of user terminals in the multiuser system 100) can be characterized by an $N_r \times N_t$ channel response matrix $H_k$, which may be expressed as:

$$H_k = \begin{bmatrix} h_{1,1}^k & h_{1,2}^k & \cdots & h_{1,N_t}^k \\ h_{2,1}^k & h_{2,2}^k & \cdots & h_{2,N_t}^k \\ \vdots & \vdots & \ddots & \vdots \\ h_{N_r,1}^k & h_{N_r,2}^k & \cdots & h_{N_r,N_t}^k \end{bmatrix}, \quad (1)$$

where entry $h_{i,j}^k$, for i=1, ..., $N_r$ and j=1, ..., $N_t$, denotes the coupling or complex gain between the access point antenna j and antenna i of the $k^{th}$ user terminal.

Data may be transmitted in various manners in the multiuser wireless system. For certain embodiments of the present disclosure, $N_S$ modulated data symbol streams may be mapped to $N_t$ transmit antennas using a proposed precoding technique. Therefore, $N_S$ modulated symbol streams may be transmitted simultaneously from the $N_t$ antennas at the access point. The $N_{S_k}$ spatial data streams out of $N_S$ may be dedicated to the $k^{th}$ user terminal, where $N_{S_k} \leq N_S$ and $$\sum_{k=1}^{K} N_{S_k} = N_S, \text{ for } k = 1, \ldots, K.$$

The received symbols at the $k^{th}$ user terminal for this transmission scheme may be expressed as:

$$y_k = H_k x + n_k,  \quad (2)$$

where x is a post-precoding $N_t \times 1$ vector of complex numbers to be transmitted by the access point, $y_k$ is an $N_r \times 1$ vector with entries for $N_r$ received symbols obtained via the $N_r$ antennas at the $k^{th}$ user terminal, and $n_k$ is a noise vector observed at the $k^{th}$ user terminal. For simplicity, the noise may be assumed to be additive white Gaussian noise (AWGN) with a zero mean vector and a covariance matrix of $\Lambda_k = \sigma_k^2 I$, where $\sigma_k^2$ is a variance of the noise observed by the $k^{th}$ user terminal and I is the identity matrix.

The preceding technique applied at the transmitter may provide orthogonality between users. Therefore, there may be no inter-user interference between separate $N_{S_k}$ spatial streams dedicated for the arbitrary user terminal k, where k=1, ..., K. However, data symbol streams transmitted from the $N_t$ antennas at the access point may interfere with each other at the $k^{th}$ user terminal. A given data symbol stream transmitted from one access point antenna may be received by all $N_r$ user terminal antennas at different amplitudes and phases. Each received symbol stream includes a component of each of the $N_{S_k}$ data symbol streams dedicated to the $k^{th}$ user terminal. The $N_r$ received symbol streams would collectively include all of the $N_{S_k}$ data symbol streams. However, these $N_{S_k}$ data symbol streams may be dispersed among the $N_r$ received symbol streams. The $k^{th}$ user terminal may perform receiver spatial processing on the $N_r$ received symbol streams to recover the $N_{S_k}$ data symbol streams dedicated to the $k^{th}$ user terminal.

The achievable performance for the arbitrary $k^{th}$ user terminal may be dependent (to a large extent) on its channel response matrix $H_k$. If a high degree of correlation exists within $H_k$, then each data symbol stream out of $N_{S_k}$ spatial streams would observe a large amount of interference from other streams dedicated to the $k^{th}$ user terminal, which cannot be sufficiently removed by the receiver spatial processing at the user terminal. The high level of interference degrades the SNR of each affected data symbol stream, possibly to a point where the data symbol stream cannot be decoded correctly by the user terminal. In the present disclosure, a linear precoding based on eigenmode selection and a minimum mean square error technique (hereinafter abbreviated as the MMSE-ES) is proposed that decreases correlation between different spatial streams dedicated to the same user terminal and increases transmission capacity, while providing orthogonality between distinct user terminals.

MMSE Linear Precoding in Multiuser MIMO System

Once the channel matrix $H_k$ from equation (2) is estimated at the arbitrary $k^{th}$ user terminal that also includes the squared path-losses for modulated spatial streams dedicated to that user terminal, the singular-value decomposition of the matrix $H_k$ may be performed at every user terminal as:

$$H_k = U_k \cdot S_k \cdot V_k^H, k=1, \ldots, K, \quad (3)$$

where $U_k$ is an $N_r \times N_r$ matrix of left eigenvectors, $S_k$ is an $N_r \times N_r$ diagonal matrix of eigenvalues for $N_r$ spatial streams, and $V_k$ is an $N_r \times N_r$ matrix of right eigenvectors. It can be assumed, without losing generality, that each user terminal k (k=1, ..., K) may select $N_{S_k}$ dominant eigenmodes and feed back related information about selected eigenmodes, such as the quantized eigenvectors and eigenvalues, to the access point.

When the access point obtains through feedback the quantized eigenvectors and related eigenvalues of all K MIMO channels in the system (i.e., from all K user terminals), an equivalent channel matrix based on selected $N_{S_k}$ eigenmodes per user terminal k (k=1, ..., K) may be generated at the access point as:

$$\tilde{H} = [V_1(:,1:N_{S_1}) \cdot S_1(1:N_{S_1} : N_{S_1}), \ldots, V_K(:,1:N_{S_K}) \cdot S_K(1: N_{S_K}, 1:N_{S_K})]^H. \quad (4)$$

The general per-tone MMSE-ES preceding may be represented as (tone index can be omitted for simplicity):

$$\overline{W} = [\tilde{H}^H \Psi^{1/2} \cdot (\Sigma^2 + \Psi^{1/2} \tilde{H} \tilde{H}^H \Psi^{2/2})^{-1}] \cdot \Phi, \quad (5)$$

$$W = \overline{W} \cdot Q^{1/2}, \quad (6)$$

where W is a preceding matrix, $\Psi$, $\Phi$ and Q are diagonal matrices that define the preceding filter depending on a specific optimization objective, $\Sigma^2 = \text{diag}(\Sigma_1^2, \ldots, \Sigma_K^2)$ while $\Sigma_k^2 = \sigma_k^2 I_{N_{S_k}}$, and $\sigma_k^2$ is a variance of the noise observed by the $k^{th}$ user terminal.

The presented formulation is general and allows for different optimizations.

The $N_S$ modulated symbols may be preprocessed with the preceding matrix W given by equation (6) to obtain $N_t$ spatially processed, beamformed symbols that may be simultaneously transmitted to all user terminals on the most reliable eigenmodes of every MIMO channel between the access point and every individual user terminal. The spatial processing (i.e. beamforming) using the computed precoding matrix may be given as:

$$x = W \cdot s, \quad (7)$$

where s is an $N_S \times 1$ vector of modulated transmission symbols, and x is the $N_t \times 1$ vector from equation (2) of spatially processed modulated symbols that may be simultaneously transmitted to the K distinct user terminals and represents a linear combination of the users' data signals.

After the preprocessing given by equation (7) is performed, the spatial streams that are dedicated to different users may be mutually orthogonal. Therefore, there may be no inter-user interference of transmitted spatial streams from the access point to the K user terminals. In addition, the MMSE precoding technique applied at the access point may decrease a level of correlation within the MIMO channel matrix given by equation (1) (i.e., a level of correlation between different spatial streams dedicated to the same user terminal). Therefore, in order to achieve the same SNR level per user terminal as preceding techniques from the prior art, smaller transmission power may be implicated if the proposed MMSE preceding scheme is applied at the access point. Consequently, for the same transmission power the MMSE preceding scheme may provide increased transmission capacity per user terminal compared to preceding techniques from the prior art.

Figure 4:
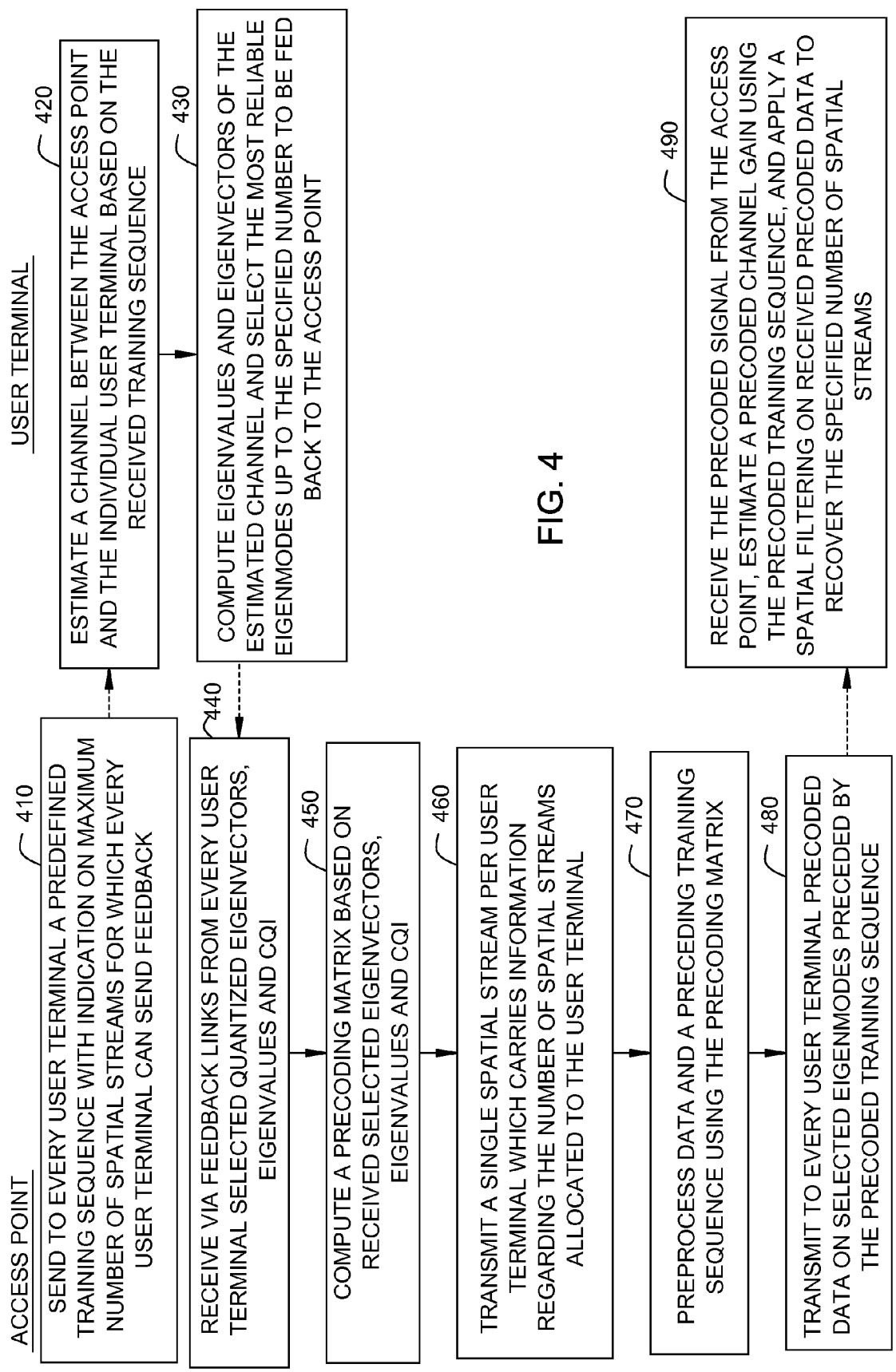
FIG. 4 shows example operations for communicating between the access point and user terminals with explicit compact feedback in an effort to generate a preceding matrix at the access point, in accordance with certain embodiments of the present disclosure.

Signaling Between Access Point and User Terminals for Generating Precoding Matrix FIG. 4 shows example operations for communicating between the access point and user terminals with explicit (compact) feedback for generating a preceding matrix at the access point. At the beginning of the operations, at 410, the access point may send to every user terminal in the system a predefined training sequence indicating the maximum number of spatial streams for which every user terminal can send feedback. At 420, each user terminal may estimate a MIMO channel between the access point and the corresponding user terminal based on the received training sequence. Subsequently, at 430, each user terminal may perform the singular value decomposition (SVD), compute eigenvalues and eigenvectors of the estimated channel, as given by equation (3), and select up to the specified number of the most reliable eigenmodes that correspond to the largest eigenvalues to be fed back to the access point.

At 440, the access point may receive (via feedback channels from every user terminal) a quantized version of selected eigenvectors, related quantized eigenvalues, and the quantized channel quality information (CQI), such as the information about the estimated signal-to-interference-plus-noise ratio (SINR) or noise variance at every user terminal. At 450, the access point may compute the preceding matrix based on the received eigenvectors, corresponding eigenvalues, and the CQI according to the MMSE technique, as given by equations (5)-(6).

At 460, the access point may start an SDMA transmission by sending a single spatial stream per user terminal that carries information regarding the number of spatial streams allocated to that particular user terminal. At 470, the access point may preprocess data and the preceding training sequence using the preceding matrix, as given by equation (7). At 480, the access point may transmit the precoded data on the selected most reliable eigenmodes that are preceded by the precoded training sequence. At 490, every user terminal may receive the precoded signal (including the precoded data and precoded training sequence) from the access point, estimate the precoded channel gain using the precoded training sequence, and apply a spatial filter to the received precoded data to recover the specified number of spatial streams dedicated to each individual user terminal.

Figure 5:
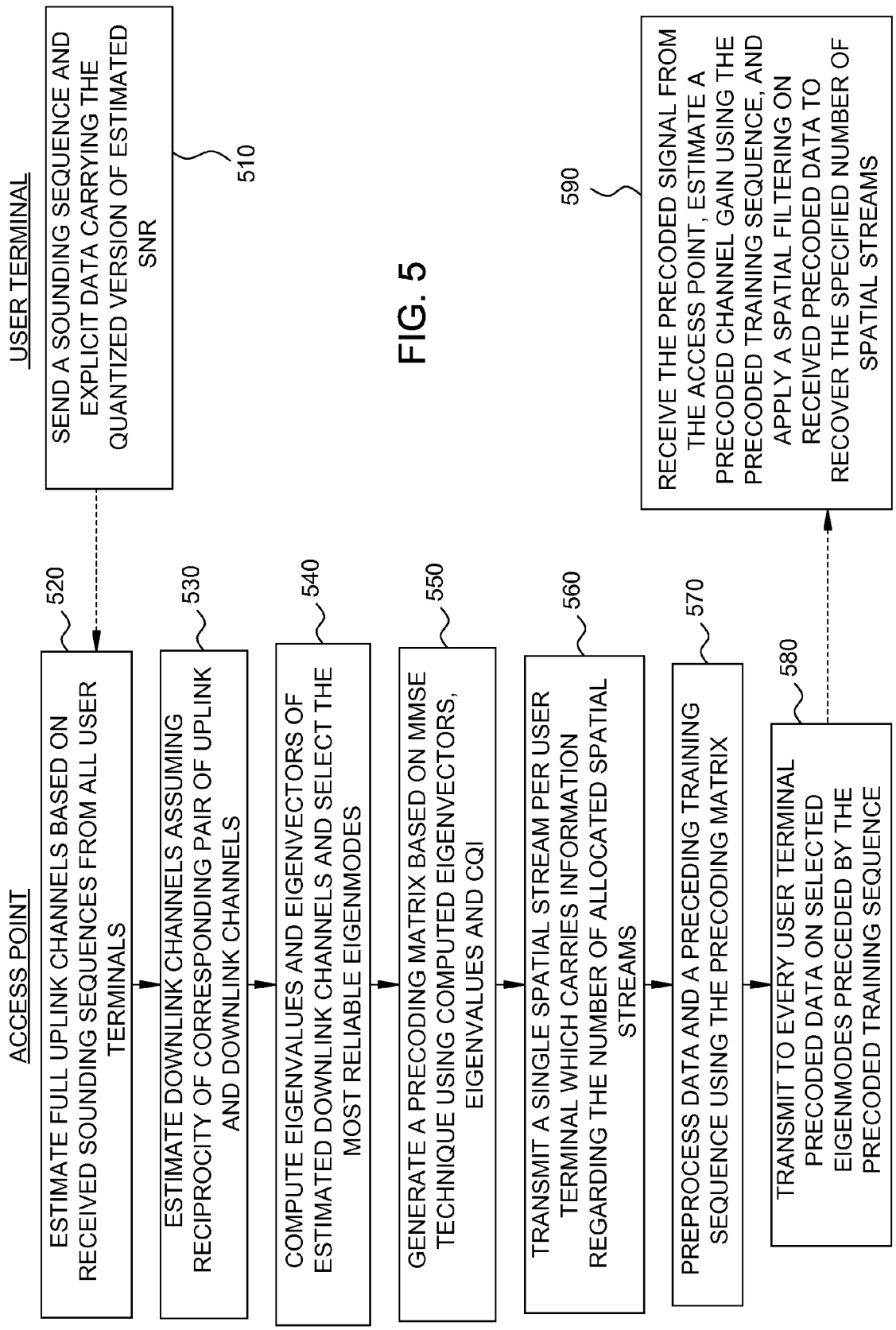
FIG. 5 shows example operations for communicating between the access point and user terminals with implicit (hybrid) feedback in an effort to generate a preceding matrix at the access point, in accordance with certain embodiments of the present disclosure.

FIG. 5 shows example operations for communicating between the access point and user terminals with implicit (hybrid) feedback in an effort to generate a preceding matrix at the access point. At 510, every user terminal may send to the access point a sounding sequence along with explicit data carrying the quantized version of the estimated SINR at each particular user terminal. At 520, the access point may estimate full uplink channels based on received sounding sequences from all user terminals. At 530, the access point may estimate MIMO downlink channels between the access point and each individual user terminal assuming reciprocity of corresponding uplink and downlink MIMO channels.

At 540, the access point may compute eigenvalues and eigenvectors of the estimated downlink channels as given by equation (3), and the access point may then select the most reliable eigenmodes up to the predefined number $N_{S_k}$ per MIMO downlink channel that corresponds to the $k^{th}$ user terminal, k=1, . . . , K, where $$\sum_{k=1}^{K} N_{S_k} = N_S.$$

At 550, using the computed eigenvectors, related eigenvalues, and estimated SINR, the access point may generate the preceding matrix W based on the MMSE technique, as given by equations (5)-(6).

At 560, the access point may start the SDMA transmission by sending a single spatial stream per user terminal that carries information regarding the number of spatial streams allocated to the user terminal. At 570, the access point may preprocess data and the preceding training sequence using the preceding matrix, as given by equation (7). At 580, the access point may transmit the precoded data on the selected most reliable eigenmodes preceded by the precoded training sequence. At 590, every user terminal may receive the precoded signal (including the precoded data and precoded training sequence) from the access point, estimate the precoded channel gain using the precoded training sequence, and apply a spatial filter to the received precoded data to recover the specified number of spatial streams dedicated to each individual user terminal.

Figure 6:
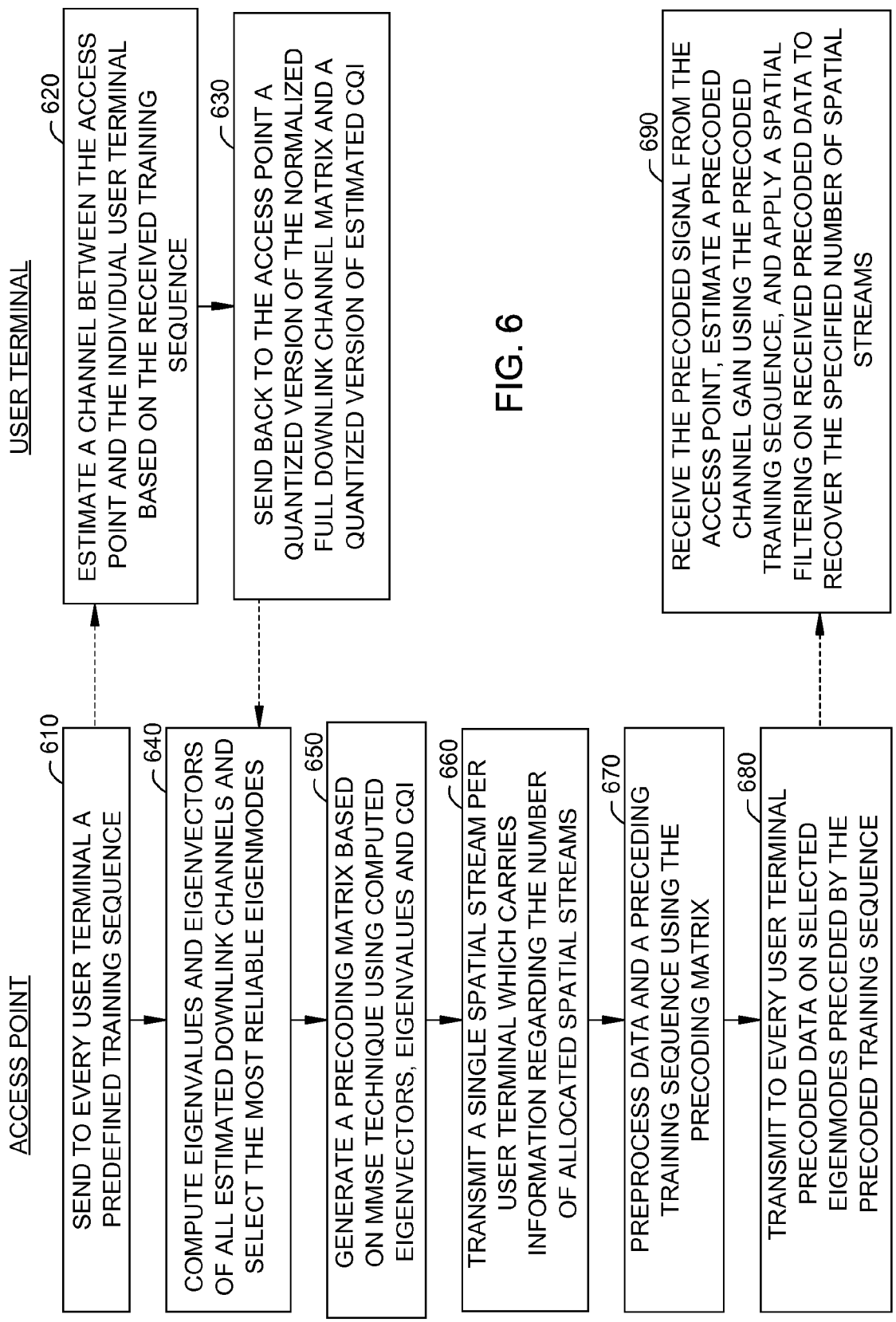
FIG. 6 shows example operations for communicating between the access point and user terminals with explicit full feedback in an effort to generate a preceding matrix at the access point, in accordance with certain embodiments of the present disclosure.

FIG. 6 shows example operations for communicating between the access point and user terminals with explicit full feedback between user terminals and the access point in an effort to generate a preceding matrix at the access point. At 610, the access point may send to every user terminal a predefined training sequence. Subsequently, at 620, every user terminal may estimate the MIMO downlink channel between the access point and the corresponding user terminal using the received training sequence. At 630, each user terminal may send back to the access point a quantized version of the normalized full downlink channel matrix and a quantized version of the estimated SINR at every user terminal.

At 640, the access point may compute eigenvalues and eigenvectors of the estimated downlink channels as given by equation (3), and the access point may then select the most reliable eigenmodes up to the predefined number $N_{S_k}$ per MIMO downlink channel that corresponds to the $k^{th}$ user terminal, k=1, . . . , K, where $$\sum_{k=1}^{K} N_{S_k} = N_S.$$

At 650, using the computed eigenvectors, related eigenvalues, and estimated SINR, the access point may generate the preceding matrix W based on the MMSE technique, as given by equations (5)-(6).

At 660, the access point may start the SDMA transmission by sending a single spatial stream per user terminal that carries information regarding the number of spatial streams allocated to the user terminal. At 670, the access point may preprocess data and the preceding training sequence using the preceding matrix, as given by equation (7). At 680, the access point may transmit the precoded data on the selected most reliable eigenmodes preceded by the precoded training sequence. At 690, every user terminal may receive the precoded signal from the access point, estimate the precoded channel gain using the precoded training sequence, and apply a spatial filter to the received precoded data to recover the specified number of spatial streams dedicated to each individual user terminal.

Figure 4A:
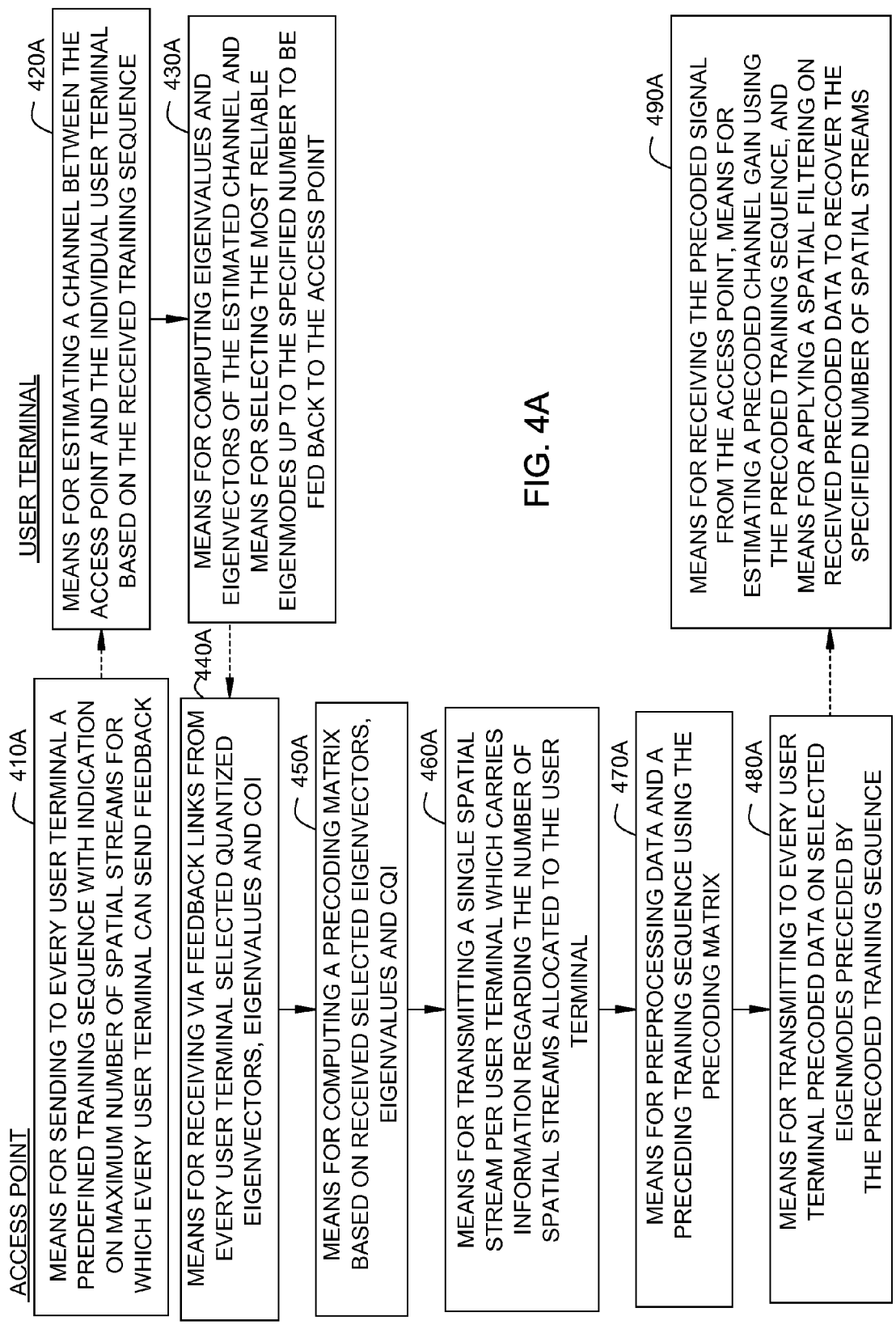
FIG. 4A illustrates example components capable of performing the operations illustrated in FIG. 4.
Figure 6A:
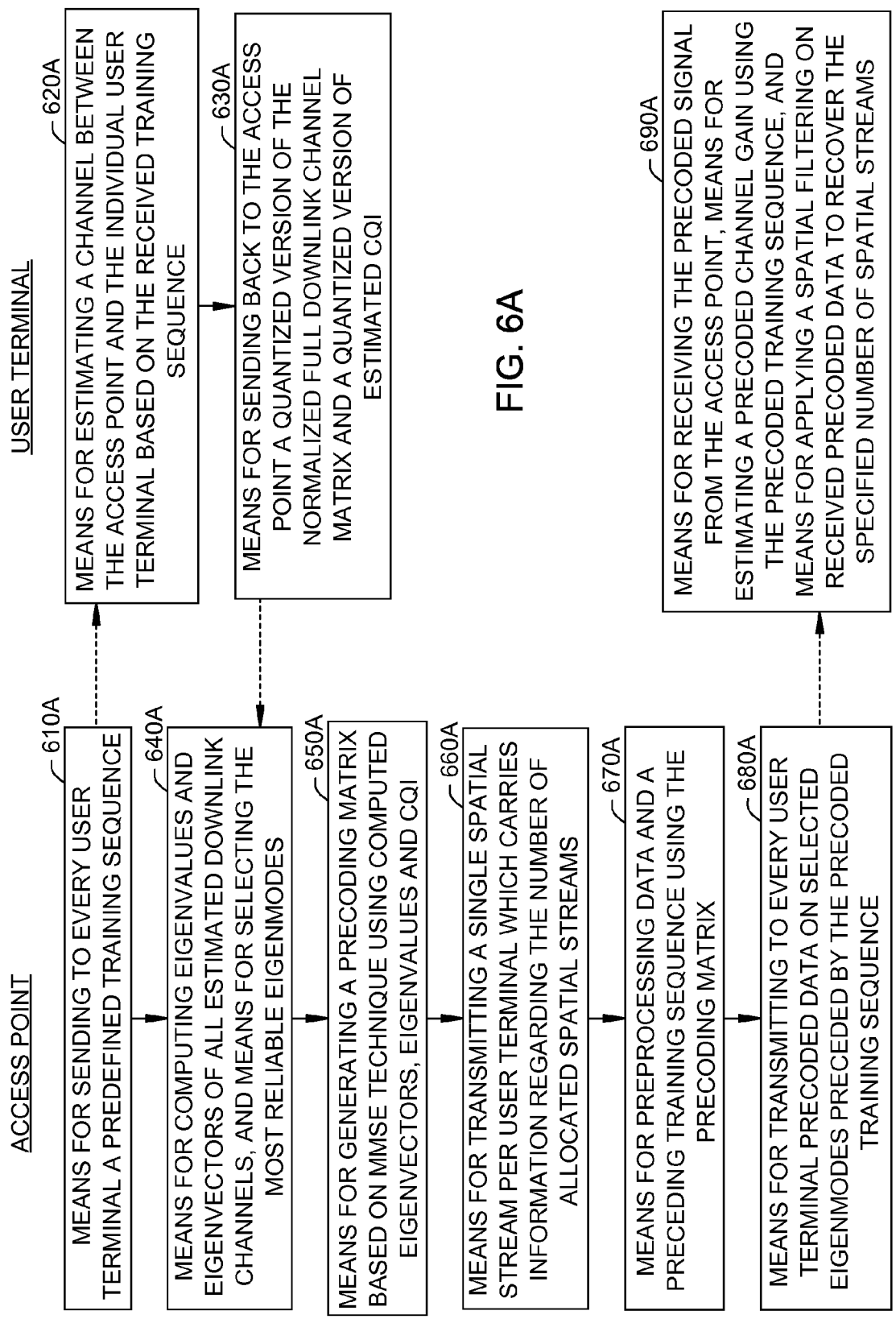
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 410-490 illustrated in FIG. 4 correspond to means-plus-function blocks 410A-490A illustrated in FIG. 4A. Similarly, blocks 510-590 illustrated in FIG. 5 correspond to means-plus-function blocks 510A-590A illustrated in FIG. 5A. Similarly, blocks 610-690 illustrated in FIG. 6 correspond to means-plus-function blocks 610A-690A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for signaling in a multiuser wireless communication system with compact feedback, comprising:
    sending to a plurality of user terminals a predefined training sequence indicating a maximum number of spatial streams for each of the user terminals to send feedback;
    receiving via feedback channels from each of the user terminals a quantized version of selected eigenvectors, corresponding quantized eigenvalues, and quantized channel quality information (CQI);
    computing a precoding matrix based on the received eigenvectors, the corresponding eigenvalues, and the CQI;
    sending a single spatial stream per user terminal that carries information regarding a number of spatial streams allocated to that specific user terminal;
    performing preprocessing of data and of a preceding training sequence using the computed precoding matrix; and
    transmitting precoded data preceded by the precoded training sequence along with an indication of the number of spatial streams to be processed at every user terminal.

2. The method of claim 1, wherein the precoding matrix is computed according to a minimum mean square error (MMSE) technique.

3. The method of claim 1, wherein the CQI comprises a signal-to-interference-plus-noise ratio (SINR) at each of the user terminals.

4. A method for signaling in a multiuser wireless communication system with hybrid feedback, comprising:
    estimating full uplink channels based on a sounding sequences received from a plurality of user terminals;
    estimating a downlink channel between the access point and each of the user terminals assuming reciprocity of corresponding uplink and downlink channels;
    computing eigenvalues and eigenvectors of estimated downlink channels;
    selecting most reliable eigenmodes up to a predefined number per downlink channel between the access point and each of the user terminals;
    generating a precoding matrix based on computed selected eigenvectors, corresponding eigenvalues, and estimated channel quality information (CQI);
    sending a single spatial stream per user terminal that carries information regarding the number of spatial streams allocated to that specific user terminal;

performing preprocessing of data and of a preceding training sequence using the precoding matrix; and transmitting the precoded data preceded by the precoded training sequence along with an indication of the number of spatial streams to be processed at every user terminal.

5. The method of claim 4, wherein the precoding matrix is generated using a minimum mean square error (MMSE) technique.

6. The method of claim 4, wherein the CQI comprises a signal-to-interference-plus-noise ratio (SINR) at every user terminal.

7. A method for signaling in a multiuser wireless communication system with full feedback, comprising:

transmitting a predefined training sequence;

computing eigenvalues and eigenvectors of estimated downlink channels;

selecting most reliable eigenmodes up to a predefined number per downlink channel between an access point and every individual user terminal;

generating a precoding matrix based on computed selected eigenvectors, corresponding eigenvalues, and estimated channel quality information (CQI);

sending a single spatial stream per user terminal that carries information regarding the number of spatial streams allocated to that specific user terminal;

performing preprocessing of data and of a preceding training sequence using the precoding matrix; and transmitting precoded data preceded by a precoded training sequence along with an indication of the number of spatial streams to be processed at every user terminal.

8. The method of claim 7, wherein the precoding matrix is generated using a minimum mean square error (MMSE) technique.

9. The method of claim 7, wherein the CQI comprises a signal-to-interference-plus-noise ratio (SINR) at every user terminal.

10. A method for signaling in a multiuser wireless communication system with full feedback, comprising:

estimating a channel between an access point and a user terminal based on a received training sequence;

transmitting a quantized version of a normalized full downlink channel matrix and a quantized version of estimated channel quality information (CQI);

receiving a precoded training sequence;

estimating a precoded channel gain using the precoded training sequence; and applying a spatial filter to received precoded data to recover a specified number of spatial streams dedicated to the user terminal.

11. The method of claim 10, wherein the CQI comprises a signal-to-interference-plus-noise ratio (SINR) at the user terminal.

12. An apparatus for signaling in a multiuser wireless communication system with compact feedback, comprising:

logic for sending to a plurality of user terminals a predefined training sequence indicating a maximum number of spatial streams for each of the user terminals to send feedback; and logic for receiving via feedback channels from each of the user terminals a quantized version of selected eigenvectors, corresponding quantized eigenvalues, and quantized channel quality information (CQI);

logic for computing a precoding matrix based on the received eigenvectors, the corresponding eigenvalues, and the CQI;

logic for sending a single spatial stream per user terminal that carries information regarding a number of spatial streams allocated to that specific user terminal;

logic for performing preprocessing of data and of a preceding training sequence using the computed precoding matrix; and logic for transmitting precoded data preceded by the precoded training sequence along with an indication of the number of spatial streams to be processed at every user terminal.

13. The apparatus of claim 12, wherein the precoding matrix is computed according to a minimum mean square error (MMSE) technique.

14. The apparatus of claim 12, wherein the CQI comprises a signal-to-interference-plus-noise ratio (SINR) at each of the user terminals.

15. An apparatus for signaling in a multiuser wireless communication system with compact feedback, comprising:

logic for estimating a channel between an access point and a user terminal based on a received training sequence;

logic for performing a singular value decomposition to compute eigenvalues and eigenvectors of the estimated channel;

logic for selecting up to a specified number of most reliable eigenmodes to be fed back to the access point;

logic for receiving a precoded signal comprising precoded data and a precoded training sequence;

logic for estimating the precoded channel gain using the precoded training sequence; and logic for applying a spatial filter to the received precoded data to recover a specified number of spatial streams dedicated to each individual user terminal.

16. An apparatus for signaling in a multiuser wireless communication system with hybrid feedback, comprising:

logic for estimating full uplink channels based on a sounding sequences received from a plurality of user terminals;

logic for estimating a downlink channel between the access point and each of the user terminals assuming reciprocity of corresponding uplink and downlink channels;

logic for computing eigenvalues and eigenvectors of estimated downlink channels; and logic for selecting most reliable eigenmodes up to a predefined number per downlink channel between the access point and each of the user terminals;

logic for generating a precoding matrix based on computed selected eigenvectors, corresponding eigenvalues, and estimated channel quality information (CQI);

logic for sending a single spatial stream per user terminal that carries information regarding the number of spatial streams allocated to that specific user terminal;

logic for performing preprocessing of data and of a preceding training sequence using the precoding matrix; and logic for transmitting the precoded data preceded by the precoded training sequence along with an indication of the number of spatial streams to be processed at every user terminal.

17. The apparatus of claim 16, wherein the precoding matrix is generated using a minimum mean square error (MMSE) technique.

18. The apparatus of claim 16, wherein the CQI comprises a signal-to-interference-plus-noise ratio (SINR) at every user terminal.

19. An apparatus for signaling in a multiuser wireless communication system with hybrid feedback, comprising:
  logic for transmitting a sounding sequence along with explicit data carrying a quantized version of estimated Channel Quality Information (CQI) at a user terminal;
  logic for receiving a precoded signal;
  logic for estimating a precoded channel gain using a precoded training sequence; and
  logic for applying a spatial filter to received precoded data to recover a specified number of spatial streams dedicated to the user terminal.

20. The apparatus of claim 19, wherein the CQI comprises a signal-to-interference-plus-noise ratio (SINR) at the user terminal.

21. An apparatus for signaling in a multiuser wireless communication system with full feedback, comprising:
  logic for transmitting a predefined training sequence;
  logic for computing eigenvalues and eigenvectors of estimated downlink channels;
  logic for selecting most reliable eigenmodes up to a predefined number per downlink channel between an access point and every individual user terminal;
  logic for generating a precoding matrix based on computed selected eigenvectors, corresponding eigenvalues, and estimated channel quality information (CQI);
  logic for sending a single spatial stream per user terminal that carries information regarding the number of spatial streams allocated to that specific user terminal;
  logic for performing preprocessing of data and of a preceding training sequence using the precoding matrix; and
  logic for transmitting precoded data preceded by a precoded training sequence along with an indication of the number of spatial streams to be processed at every user terminal.

22. The apparatus of claim 21, wherein the precoding matrix is generated using a minimum mean square error (MMSE) technique.

23. The apparatus of claim 21, wherein the CQI comprises a signal-to-interference-plus-noise ratio (SINR) at every user terminal.

24. An apparatus for signaling in a multiuser wireless communication system with full feedback, comprising:
  logic for estimating a channel between an access point and a user terminal based on a received training sequence;
  logic for transmitting a quantized version of a normalized full downlink channel matrix and a quantized version of estimated channel quality information (CQI);
  logic for receiving a precoded training sequence;
  logic for estimating a precoded channel gain using the precoded training sequence; and
  logic for applying a spatial filter to received precoded data to recover a specified number of spatial streams dedicated to the user terminal.

25. The apparatus of claim 24, wherein the CQI comprises a signal-to-interference-plus-noise ratio (SINR) at the user terminal.

26. An apparatus for signaling in a multiuser wireless communication system with compact feedback, comprising:
  means for sending to a plurality of user terminals a predefined training sequence indicating a maximum number of spatial streams for each of the user terminals to send feedback; and
  means for receiving via feedback channels from each of the user terminals a quantized version of selected eigenvectors, corresponding quantized eigenvalues, and quantized channel quality information (CQI);
  means for computing a precoding matrix based on the received eigenvectors, the corresponding eigenvalues, and the CQI;
  means for sending a single spatial stream per user terminal that carries information regarding a number of spatial streams allocated to that specific user terminal;
  means for performing preprocessing of data and of a preceding training sequence using the computed precoding matrix; and
  means for transmitting precoded data preceded by the precoded training sequence along with an indication of the number of spatial streams to be processed at every user terminal.

27. The apparatus of claim 26, wherein the precoding matrix is computed according to a minimum mean square error (MMSE) technique.

28. The apparatus of claim 26, wherein the CQI comprises a signal-to-interference-plus-noise ratio (SINR) at each of the user terminals.

29. An apparatus for signaling in a multiuser wireless communication system with compact feedback, comprising:
  means for estimating a channel between an access point and a user terminal based on a received training sequence;
  means for performing a singular value decomposition to compute eigenvalues and eigenvectors of the estimated channel;
  means for selecting up to a specified number of most reliable eigenmodes to be fed back to the access point;
  means for receiving a precoded signal comprising precoded data and a precoded training sequence;
  means for estimating the precoded channel gain using the precoded training sequence; and
  means for applying a spatial filter to the received precoded data to recover a specified number of spatial streams dedicated to each individual user terminal.

30. An apparatus for signaling in a multiuser wireless communication system with hybrid feedback, comprising:
  means for estimating full uplink channels based on a sounding sequences received from a plurality of user terminals;
  means for estimating a downlink channel between the access point and each of the user terminals assuming reciprocity of corresponding uplink and downlink channels;
  means for computing eigenvalues and eigenvectors of estimated downlink channels; and
  means for selecting most reliable eigenmodes up to a predefined number per downlink channel between the access point and each of the user terminals;
  means for generating a precoding matrix based on computed selected eigenvectors, corresponding eigenvalues, and estimated channel quality information (CQI);
  means for sending a single spatial stream per user terminal that carries information regarding the number of spatial streams allocated to that specific user terminal;
  means for performing preprocessing of data and of a preceding training sequence using the precoding matrix; and
  means for transmitting the precoded data preceded by the precoded training sequence along with an indication of the number of spatial streams to be processed at every user terminal.

31. The apparatus of claim 30, wherein the precoding matrix is generated using a minimum mean square error (MMSE) technique.

32. The apparatus of claim 30, wherein the CQI comprises a signal-to-interference-plus-noise ratio (SINR) at every user terminal.

33. An apparatus for signaling in a multiuser wireless communication system with hybrid feedback, comprising:
means for transmitting a sounding sequence along with explicit data carrying a quantized version of estimated Channel Quality Information (CQI) at a user terminal;
means for receiving a precoded signal;
means for estimating a precoded channel gain using a precoded training sequence; and
means for applying a spatial filter to received precoded data to recover a specified number of spatial streams dedicated to the user terminal.

34. The apparatus of claim 33, wherein the CQI comprises a signal-to-interference-plus-noise ratio (SINR) at the user terminal.

35. An apparatus for signaling in a multiuser wireless communication system with full feedback, comprising:
means for transmitting a predefined training sequence;
means for computing eigenvalues and eigenvectors of estimated downlink channels; and
means for selecting most reliable eigenmodes up to a predefined number per downlink channel between an access point and every individual user terminal
means for generating a precoding matrix based on computed selected eigenvectors, corresponding eigenvalues, and estimated channel quality information (CQI);
means for sending a single spatial stream per user terminal that carries information regarding the number of spatial streams allocated to that specific user terminal;
means for performing preprocessing of data and of a preceding training sequence using the precoding matrix; and
means for transmitting precoded data preceded by a precoded training sequence along with an indication of the number of spatial streams to be processed at every user terminal.

36. The apparatus of claim 35, wherein the precoding matrix is generated using a minimum mean square error (MMSE) technique.

37. The apparatus of claim 35, wherein the CQI comprises a signal-to-interference-plus-noise ratio (SINR) at every user terminal.

38. An apparatus for signaling in a multiuser wireless communication system with full feedback, comprising:
means for estimating a channel between an access point and a user terminal based on a received training sequence;
means for transmitting a quantized version of a normalized full downlink channel matrix and a quantized version of estimated channel quality information (CQI);
means for receiving a precoded training sequence;
means for estimating a precoded channel gain using the precoded training sequence; and
means for applying a spatial filter to received precoded data to recover a specified number of spatial streams dedicated to the user terminal.

39. The apparatus of claim 38, wherein the CQI comprises a signal-to-interference-plus-noise ratio (SINR) at the user terminal.

40. A non-transitory computer-program product for signaling in a multiuser wireless communication system with compact feedback, comprising a computer readable medium having instructions stored thereon, the instructions being executable by one or more processors and the instructions comprising:
instructions for sending to a plurality of user terminals a predefined training sequence indicating a maximum number of spatial streams for each of the user terminals to send feedback; and
instructions for receiving via feedback channels from each of the user terminals a quantized version of selected eigenvectors, corresponding quantized eigenvalues, and quantized channel quality information (CQI);
instructions for computing a precoding matrix based on the received eigenvectors, the corresponding eigenvalues, and the CQI;
instructions for sending a single spatial stream per user terminal that carries information regarding a number of spatial streams allocated to that specific user terminal;
instructions for performing preprocessing of data and of a preceding training sequence using the computed precoding matrix; and
instructions for transmitting precoded data preceded by the precoded training sequence along with an indication of the number of spatial streams to be processed at every user terminal.

41. The non-transitory computer-program product of claim 40, wherein the precoding matrix is computed according to a minimum mean square error (MMSE) technique.

42. The non-transitory computer-program product of claim 40, wherein the CQI comprises a signal-to-interference-plus-noise ratio (SINR) at each of the user terminals.

43. A non-transitory computer-program product for signaling in a multiuser wireless communication system with compact feedback, comprising a computer readable medium having instructions stored thereon, the instructions being executable by one or more processors and the instructions comprising:
instructions for estimating a channel between an access point and a user terminal based on a received training sequence;
instructions for performing a singular value decomposition to compute eigenvalues and eigenvectors of the estimated channel;
instructions for selecting up to a specified number of most reliable eigenmodes to be fed back to the access point;
instructions for receiving a precoded signal comprising precoded data and a precoded training sequence;
instructions for estimating the precoded channel gain using the precoded training sequence; and
instructions for applying a spatial filter to the received precoded data to recover a specified number of spatial streams dedicated to each individual user terminal.

44. A non-transitory computer-program product for signaling in a multiuser wireless communication system with hybrid feedback, comprising a computer readable medium having instructions stored thereon, the instructions being executable by one or more processors and the instructions comprising:
instructions for estimating full uplink channels based on a sounding sequences received from a plurality of user terminals;
instructions for estimating a downlink channel between the access point and each of the user terminals assuming reciprocity of corresponding uplink and downlink channels;
instructions for computing eigenvalues and eigenvectors of estimated downlink channels;
instructions for selecting most reliable eigenmodes up to a predefined number per downlink channel between the access point and each of the user terminals;

instructions for generating a precoding matrix based on computed selected eigenvectors, corresponding eigenvalues, and estimated channel quality information (CQI);

instructions for sending a single spatial stream per user terminal that carries information regarding the number of spatial streams allocated to that specific user terminal;

instructions for performing preprocessing of data and of a preceding training sequence using the precoding matrix; and instructions for transmitting the precoded data preceded by the precoded training sequence along with an indication of the number of spatial streams to be processed at every user terminal.

45. The non-transitory computer-program product of claim 44, wherein the precoding matrix is generated using a minimum mean square error (MMSE) technique.

46. The non-transitory computer-program product of claim 44, wherein the CQI comprises a signal-to-interference-plus-noise ratio (SINR) at every user terminal.

47. A non-transitory computer-program product for signaling in a multiuser wireless communication system with hybrid feedback, comprising a computer readable medium having instructions stored thereon, the instructions being executable by one or more processors and the instructions comprising:

instructions for transmitting a sounding sequence along with explicit data carrying a quantized version of estimated Channel Quality Information (CQI) at a user terminal;

instructions for receiving a precoded signal;

instructions for estimating a precoded channel gain using a precoded training sequence; and instructions for applying a spatial filter to received precoded data to recover a specified number of spatial streams dedicated to the user terminal.

48. A non-transitory computer-program product of claim 47, wherein the CQI comprises a signal-to-interference-plus-noise ratio (SINR) at the user terminal.

49. A non-transitory computer-program product for signaling in a multiuser wireless communication system with full feedback, comprising a computer readable medium having instructions stored thereon, the instructions being executable by one or more processors and the instructions comprising:

instructions for transmitting a predefined training sequence;

instructions for computing eigenvalues and eigenvectors of estimated downlink channels;

instructions for selecting most reliable eigenmodes up to a predefined number per downlink channel between an access point and every individual user terminal;

instructions for generating a precoding matrix based on computed selected eigenvectors, corresponding eigenvalues, and estimated channel quality information (CQI);

instructions for sending a single spatial stream per user terminal that carries information regarding the number of spatial streams allocated to that specific user terminal;

instructions for performing preprocessing of data and of a preceding training sequence using the precoding matrix; and instructions for transmitting precoded data preceded by a precoded training sequence along with an indication of the number of spatial streams to be processed at every user terminal.

50. The non-transitory computer-program product of claim 49, wherein the precoding matrix is generated using a minimum mean square error (MMSE) technique.

51. The non-transitory computer-program product of claim 49, wherein the CQI comprises a signal-to-interference-plus-noise ratio (SINR) at every user terminal.

52. A non-transitory computer-program product for signaling in a multiuser wireless communication system with full feedback, comprising a computer readable medium having instructions stored thereon, the instructions being executable by one or more processors and the instructions comprising:

instructions for estimating a channel between an access point and a user terminal based on a received training sequence;

instructions for transmitting a quantized version of a normalized full downlink channel matrix and a quantized version of estimated channel quality information (CQI);

instructions for receiving a precoded training sequence;

instructions for estimating a precoded channel gain using the precoded training sequence; and instructions for applying a spatial filter to received precoded data to recover a specified number of spatial streams dedicated to the user terminal.

53. The non-transitory computer-program product of claim 52, wherein the CQI comprises a signal-to-interference-plus-noise ratio (SINR) at the user terminal.

* * * * *